March 21, 1961  J. R. BELL  2,976,371
SAFETY RECORDING DEVICE
Filed April 15, 1959
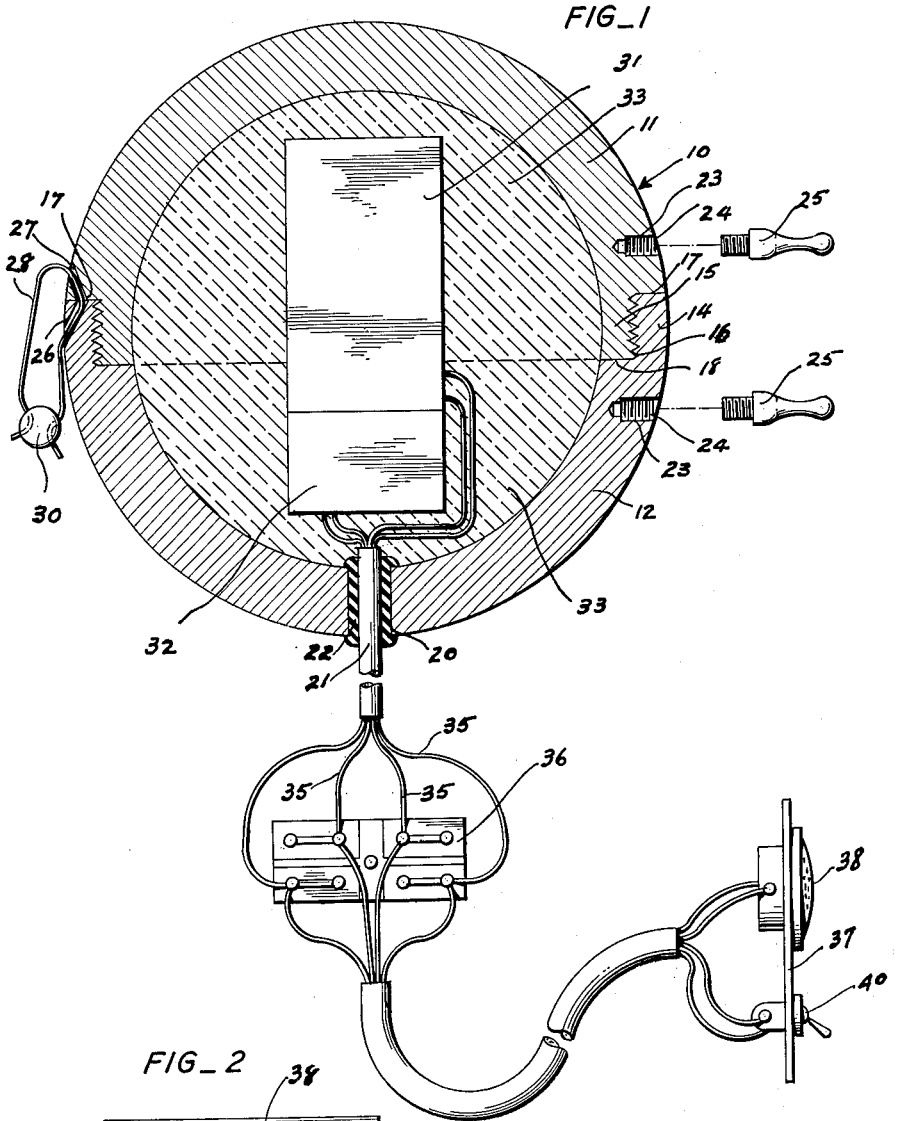
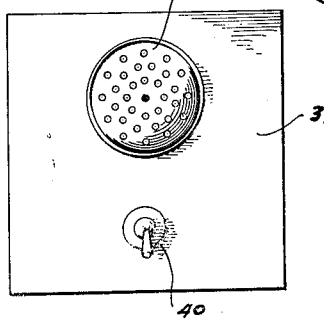
INVENTOR.
JAMES R. BELL
BY
ATTORNEY

United States Patent Office 2,976,371
Patented Mar. 21, 1961

2,976,371

SAFETY RECORDING DEVICE

James R. Bell, San Lorenzo, Calif.
(14795 Washington Ave., San Leandro, Calif.)

Filed Apr. 15, 1959, Ser. No. 806,498

6 Claims. (Cl. 179—100.1)

This invention relates to a recording device with a specially designed protective housing which will withstand heavy impacts and severe extremes of heat and cold and protect and preserve the recorded signals. It is a well-known fact that major disasters such as airplane and helicopter crashes, submarine disasters, train wrecks and the like, where the operating personnel do not survive the disaster, the remains of the craft are carefully checked over by experts in order to analyze and determine the cause of the disaster. The determination of the cause of the disaster is sufficient reason for the careful investigation, but fully as important is the understanding of the cause with respect to future design and engineering for the prevention of similar disasters. Of course, these after-examinations are for the most part conjecture, and even though carefully and painstakingly done, there still remains a doubt because no one knows with certainty what actually happened. Even a few words of information as to what really happened would have been valuable to end the doubts as well as establish the facts. It seems certain that if, in the few minutes or seconds prior to impending disaster, the operating personnel could have the opportunity to give any information, it would be exceedingly valuable. The problem would still remain, however, as to the precise means of preserving whatever is said or done from destruction in the consequences of the disaster, whatever they may be.

Accordingly, it is an object of the present invention to provide an instrument which will record and preserve the recording of the words, instructions, noise, or events of the minutes or seconds just prior to the impending disaster without requiring the operating personnel to do anything more than flick the switch, putting the instrument and separate circuit in self-contained operation.

It is another object of the invention to provide such a device which is a separate system carrying its own power source independent of the craft, so that it will not be affected by any power or mechanical failure which may be the cause of the disaster.

It is a further object of the invention to provide a self-contained tape recorder and power unit within an indestructible housing, remote from the place of greatest peril, so that it can be positioned in a place of least peril. Accordingly, the equipment must be such both in size and weight that it may be positioned, for example, in the tail assembly of an aircraft, without disturbing the design, the weight, or the operation thereof. It is apparent, of course, that the tail assembly is the place of least peril in an aircraft crash, and is a most approachable portion in the event of fire.

Further objects are to provide a construction of maximum simplicity, economy, and ease of manufacture, also such further objects, advantages and capabilities as will fully appear and as are inherently possessed by the device and the invention described herein.

Invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawings:

Figure 1 is a diagrammatic view of the apparatus of the present invention; and

Figure 2 is a front elevational view of the control panel, indicating that it requires only a very insignificant amount of space on an already crowded instrument panel, or in any other convenient location.

Referring now more particularly to the drawings in which like reference numerals indicate like parts in the two figures, and especially to the diagrammatic illustration of Figure 1, there is shown therein a spherical housing 10 comprising two separable halves 11 and 12 of substantially equal balance. The upper portion 11 of the spherical housing 10 has an inner depending portion 15 externally threaded at 16, which meets with the outer stepped lip 14 of the lower housing 12 with internal matching threads as at 16. The threads 16 are so matched and the depth of the lips 14 and 15 are so related that the abutting wall faces at 17 and 18 meet flush and tight with substantially no space therebetween.

The spherical housing 10 is preferably made of specially compounded steel, magnesium or any other suitable material and is of substantial thickness so as to withstand heavy impact and temperature extremes, both hot and cold, which may be encountered. It will be seen that when the two portions of the shell or housing 11 and 12 are properly closed, that the spherical housing forms a continuous shell of substantial and uniform thickness of wall, and is substantially free of internal or external protrusions or indentations.

To facilitate opening and closing the housing 10, there are a pair of spaced threaded holes 23 which receive the removable threaded handles 25, one being in the upper housing portion 11 and the other being in the lower housing portion 12. The threaded holes 23 do not pierce through the wall of the housing 10, but merely extend a sufficient depth to insure a gripping for the handles 25. Since one of the holes 23 is in the upper portion of the housing 11, and the other in the lower portion of the housing 12, it will be observed that when the handles 25 are in position in the threaded holes 23, that movement in the opposite directions will permit either the opening or the closing of the housing 10. When the handles are removed and are not so in use, the threaded holes 23 are substantially completely closed by threaded plugs 24 which are shaped to conform with the periphery of the sphere 10, so as to fill the voids and present a substantially smooth outer surface.

In many instances it may be desirable to seal the housing 10 in the closed position by means which will identify the fact as to whether or not the internal equipment has been tampered with or disturbed. To this end, small holes 26 and 27 are drilled angularly inwardly so as to intersect on the abutting face 17 of the two portions of the housing 10. A wire 28 is passed through the angular passages 26 and 27 and the loose ends of the wire 28 are sealed in any suitable manner as at 30. The holes or passages 26 and 27 are not sufficient in size or extent to have any appreciable effect on the impact resistance of the housing structure.

Contained within the spherical housing is a small tape or other recorder 31 powered by its own separate power source such as battery 32. Recent developments in the field of very small tape recorders and very small but powerful batteries make the present equipment completely practical and effective. Insulating material 33 is packed around the recorder 31 and the power source 32 to the extent of filling the entire space, and cushions the equipment on impact as well as protecting it from extremes of temperature. Obviously, the equipment could be suspended within the housing 10 from a plurality of points so as to resist shock, in which event the surrounding dead air space would be the insulation. The lead wires 35 connecting and from the internal equipment 31 and 32 pass through the housing in a cable 21 via a radial hole 20 which pierces the shell of the sphere 10. The radial hole 20 may be small enough to just permit the passage of the cable 21 carrying the wires 35, or it may include insulation 22 to protect the cable 21 from all but the severest shocks and heat. The lead wires 35 are connected to a terminal block 36 and thence to a small control panel 37 located at some remote point as for example in the pilot's compartment. On the control panel 37 is a small microphone 38 and an "on-and-off" toggle switch 40 directly connected to the power source 32 and recording means 31 inside the housing 10. Obviously, other microphones 38 can be spotted at other remote locations, in different parts of an airplane for example, by means of appropriate connections to the terminal block 36, with switches for establishing the circuit for recording on the tape recorder 31. However, the equipment is so small in size and so relatively inexpensive that it is far better to have a separate unit for each microphone, than to complicate the system or run the risk of overlapping recording.

In operation the present equipment is intended primarily for emergency use to record the last moments of impending disaster. For example, in the final minutes or seconds prior to an airplane crash, regardless of the failure of every other system. All the pilot, or anyone else for that matter, has to do is to throw the toggle switch 40 to the "on" position and just talk, if he is able, or if not for any reason, the recorder will be activated and record the noises, sounds, conversations, and anything else occurring in the compartment where the microphone is located. Thus, even if those in charge of the operation of the craft are killed in the resulting crash and the plane destroyed, nevertheless since the spherical housing 10 is built to withstand the crash impact and the results thereof, the final moments prior to the crash will be recorded and safely preserved for later study and analysis. It is of no consequence that the cable 21 adjacent the point of entry into the housing 10 may be severed or destroyed in the crash because the final moments have already been placed on the tape. If a fire should result, the nature of the material and its substantial thickness as well as the insulation 33 will protect the equipment carried by the sphere 10 a sufficient length of time to permit its undamaged removal from the wreckage. In this manner hitherto unreported and unreportable facts and circumstances relating to the causes of airplane crashes or other disasters, will be available to help both in the design and safety of aircraft thereafter and in a great measure prevent future accidents of the same nature.

I claim:

1. A self-contained emergency recording instrument comprising in combination a spherical housing having two separable portions joined to form a continuous shell of substantial and uniform thickness, a self-contained recorder within said housing, a separate power source for said recorder and in circuit therewith in said housing, insulation packing around said recorder and power source and filling the space within said housing, and means passing through said housing comprising a circuit connecting said power source and recorder for accepting signals at a remote station and recording the same on said recorder.

2. A self-contained emergency recording instrument comprising in combination a spherical housing having two separable portions joined to form a continuous shell of substantial and uniform thickness, removable external means associated with said housing operable to separate or join the two portions of said housing, a self-contained recorder within said housing, a separate power source for said recorder and in circuit therewith in said housing, insulation packing around said recorder and power source and filling the space within said housing, a remotely located microphone in circuit with said power source and said recorder, and means passing through said housing comprising a circuit connecting said power source and recorder and said microphone for accepting signals at the remote microphone and recording the same on said recorder.

3. A self-contained emergency recording instrument comprising in combination a spherical housing having two separable portions joined to form a continuous shell of substantial and uniform thickness, said shell being resistant to destruction by severe impact and extremes of temperature, removable external means associated with said housing operable to separate or join the two portions of said housing, a self-contained recorder within said housing, a separate electrical power source for said recorder and in circuit therewith in said housing, insulation packing around said recorder and power source and filling the space within said housing, said insulation being a cushion for impact shock as well as protection from extremes of temperatures, a remotely located microphone in circuit with said power source and said recorder, and means passing through said housing comprising an electrical circuit connecting said power source and recorder and said microphone for accepting signals at the remote microphone and recording the same on said recorder.

4. A self-contained emergency recording instrument comprising in combination a spherical housing having two separable portions joined to form a continuous shell of substantial and uniform thickness, a small self-contained recorder within said housing and protected thereby, a separate power source for said recorder and in circuit therewith within said housing and protected thereby, shock resisting means mounting said recorder and said power source within said housing, and means passing through said housing comprising a circuit connecting said power source and recorder for accepting signals at a remote station and recording the same on said recorder.

5. A self-contained emergency recording instrument comprising in combination a spherical housing having two separable portions joined to form a continuous shell of substantial and uniform thickness, removable external means associated with said housing operable to separate or join the two portions of said housing, a small self-contained recorder within said housing and protected thereby, a separate power source for said recorder and in circuit therewith within said housing and protected thereby, shock resisting means mounting said recorder and said power source within said housing, a remotely located microphone in circuit with said power source, said recorder and said microphone, and means passing through said housing comprising a circuit connecting said power source and recorder for accepting signals at the remote microphone and recording the same on said recorder.

6. A self-contained emergency recording instrument comprising in combination a spherical housing having two separable portions joined to form a continuous shell of substantial and uniform thickness, said shell being resistant to destruction by severe impact and extremes of heat and temperature, removable external means associated with said housing operable to separate or join the two portions of said housing, a small self-contained recorder within said housing and protected thereby, a separate electrical power source for said recorder and in circuit therewith within said housing and protected thereby, shock resisting means mounting said recorder and said power source within said housing, a remotely located microphone in circuit with said power source, said recorder and said microphone, and means passing through said housing comprising an electrical circuit connecting said power source and recorder for accepting signals at the remote microphone and recording the same on said recorder.

References Cited in the file of this patent

UNITED STATES PATENTS

| | | |
|---|---|---|
| 300,339 | Brintnall | June 17, 1884 |
| 693,857 | Gustapon | Feb. 25, 1902 |
| 2,182,632 | Kiernan | Dec. 5, 1939 |
| 2,267,364 | Blount | Dec. 23, 1941 |